United States Patent
Dehaut et al.

(10) Patent No.: US 7,573,367 B2
(45) Date of Patent: Aug. 11, 2009

(54) TAG CONFLICT AVOIDANCE METHOD AND APPARATUS

(75) Inventors: Pierre Dehaut, Gyeonggi-do (KR);
Kyung-ho Park, Gyeonggi-do (KR);
Moutchkaev Artem, Gyeonggi-do (KR);
Ji-hun Koo, Gyeonggi-do (KR);
Si-gyoung Koo, Seoul (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 646 days.

(21) Appl. No.: 11/245,193

(22) Filed: Oct. 7, 2005

(65) Prior Publication Data

US 2006/0082443 A1    Apr. 20, 2006

(30) Foreign Application Priority Data

Oct. 15, 2004    (KR) ............... 10-2004-0082814

(51) Int. Cl.
*H04Q 5/22*    (2006.01)
*G08B 13/14*    (2006.01)

(52) U.S. Cl. .............. 340/10.2; 340/10.1; 340/572.1

(58) Field of Classification Search ........... 340/10.2, 340/10.1, 572.1; 370/229–240; 375/130–146, 375/240–240.29
See application file for complete search history.

(56) References Cited

U.S. PATENT DOCUMENTS

| | | | | |
|---|---|---|---|---|
| 4,527,275 A | * | 7/1985 | Russell | 375/145 |
| 5,012,240 A | * | 4/1991 | Takahashi et al. | 341/101 |
| 6,265,963 B1 | * | 7/2001 | Wood, Jr. | 340/10.4 |
| 7,075,436 B2 | * | 7/2006 | Shanks et al. | 340/572.1 |
| 7,366,222 B2 | * | 4/2008 | Song et al. | 375/130 |
| 2003/0214389 A1 | * | 11/2003 | Arneson et al. | 340/10.1 |
| 2004/0066279 A1 | * | 4/2004 | Hughes et al. | 340/10.1 |

OTHER PUBLICATIONS

Mano, M.M., Digital Design, 1991, Prentice-Hall, Inc., Second Edition, pp. 2-4, 18.*

* cited by examiner

*Primary Examiner*—Benjamin C Lee
*Assistant Examiner*—Michael Shannon
(74) *Attorney, Agent, or Firm*—Sughrue Mion, PLLC

(57) ABSTRACT

A method and system for avoiding tag conflict by identifying a RFID using a K-nary tree search. The tag conflict avoidance system includes a plurality of tags receiving a first signal, converting identification codes of the tags into predetermined codes according to the first signal, and outputting the converted codes as second signals. The tag conflict avoidance system also includes a reader outputting the first signal, receiving the second signals, and identifying the tags using the codes included in the second signals.

9 Claims, 5 Drawing Sheets

FIG. 5

| | TRANSMISSION COMMAND <11111111> | TRANSMISSION | TRANSMISSION COMMAND <10111111> | TRANSMISSION | TRANSMISSION COMMAND <11101111> | TRANSMISSION |
|---|---|---|---|---|---|---|
| READ RESULT | | 1X1X001X | | 101X001X | | 111X0011 |
| TAG GROUP 1 | → | 10110010 | → | 10110010 | | |
| TAG GROUP 2 | → | 10100011 | → | 10100011 | | |
| TAG GROUP 3 | → | 11110011 | | | → | 11110011 |
| TAG GROUP 4 | → | 11100011 | | | → | 11100011 |
| | (a) | (b) | (c) | (d) | (e) | (f) |

FIG. 6

| | TRANSMISSION COMMAND | TRANSMISSION |
|---|---|---|
| | | X0X000XX |
| TAG GROUP 1 | ⟶ | 00000010 |
| TAG GROUP 2 | ⟶ | 00100000 |
| TAG GROUP 3 | ⟶ | 00000001 |
| TAG GROUP 4 | ⟶ | 10000000 |

(a)    (b)

TAG CONFLICT AVOIDANCE METHOD AND APPARATUS

CROSS-REFERENCE TO RELATED PATENT APPLICATIONS

This application claims the benefit of Korean Patent Application No. 10-2004-0082814, filed on Oct. 15, 2004, in the Korean Intellectual Property Office, the disclosure of which is incorporated herein in its entirety by reference.

BACKGROUND OF THE INVENTION

1. Field of the Invention

The present invention relates to a tag conflict avoidance method and apparatus, and more particularly, to a method and apparatus of recognizing a plurality of tags using a K-nary tree search.

2. Description of the Related Art

Tag conflict avoidance refers to recognition of a plurality of tags without conflict when the tags are simultaneously activated by one reader. Recently, as radio frequency identification (RFID) technology is used in managing various materials or data, a plurality of tags must be simultaneously recognized when the tags are located in a field.

The RFID is an automatic recognizer which transmits/receives data stored in a tag, a label, or a card in which a micro chip is mounted, to/from a reader using a radio frequency. The RFID system includes a tag and a reader. The tag converts a unique identification code into a RF signal and transmits the RF signal to the reader by a call of the reader, and the reader suitably processes the received RF signal to identify the tag. If the tag is identified, data regarding an object bearing the tag is properly processed in a data processing system connected to the reader.

In the event of a conflict among tags in the RFID system, the output signals of the tags interfere with each other and cannot reach the reader. Accordingly, when a plurality of the tags simultaneously enter into a cover of the reader, the tags should be identified while avoiding such a conflict.

SUMMARY OF THE INVENTION

The present invention provides a method and apparatus of avoiding tag conflict by identifying a RFID using a K-nary tree search.

According to an aspect of the present invention, there is provided a tag conflict avoidance system comprising a plurality of tags receiving a first signal, converting identification codes of the tags into predetermined codes according to the first signal, and outputting the converted codes as second signals; and a reader outputting the first signal, receiving the second signals, and identifying the tags using the codes included in the second signals.

According to another aspect of the present invention, there is provided a tag conflict avoidance method comprising a plurality of tags receiving a first signal, reading and converting their own identification codes into predetermined codes according to the first signal, and outputting the converted codes as second signals; and receiving the converted codes and classifying the tags.

BRIEF DESCRIPTION OF THE DRAWINGS

The above and other features and advantages of the present invention will become more apparent by describing in detail exemplary embodiments thereof with reference to the attached drawings in which:

FIG. 5 illustrates a process of identifying tags by the conventional binary tree search method when a plurality of tags enter into one reader field; and FIG. 6 illustrates a process of identifying tags by the K-nary tree search method of an exemplary embodiment of the present invention when a plurality of tags enter into one reader field.

DETAILED DESCRIPTION OF THE INVENTION

Hereinafter, the present invention will be described in detail with reference to the attached drawings.

Figure 1:
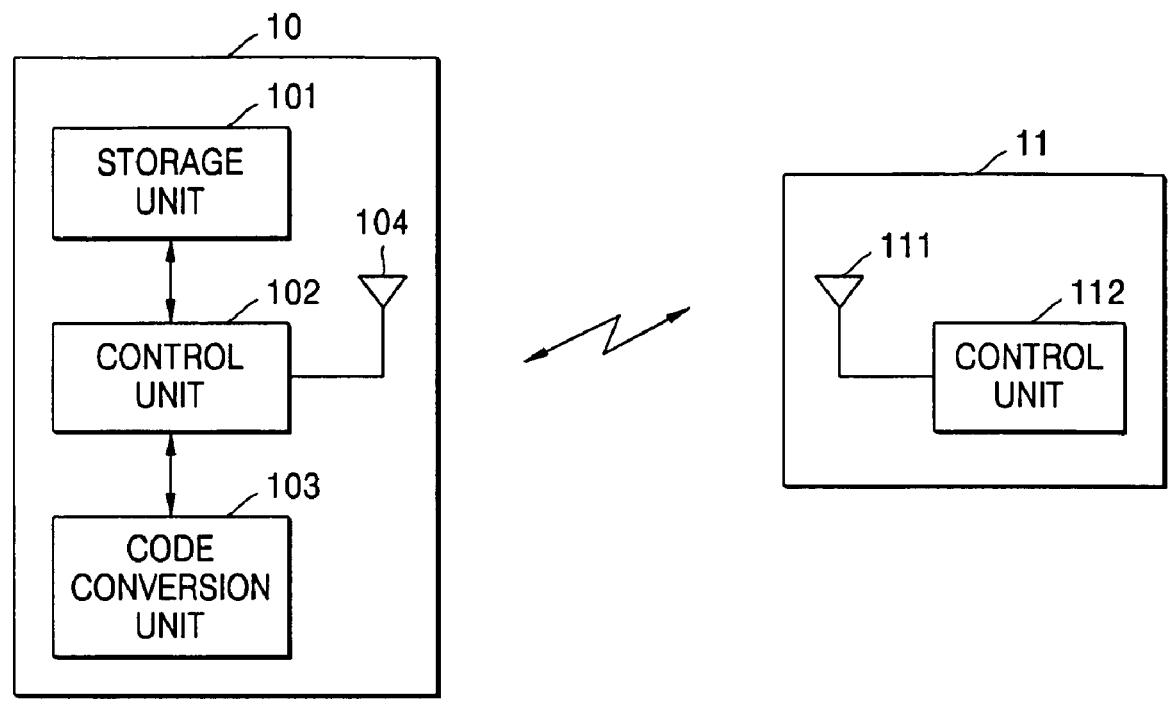
FIG. 1 is a block diagram of a tag and a reader to which a tag conflict avoidance method of an exemplary embodiment of the present invention is applied.

FIG. 1 is a block diagram of a tag 10 and a reader 11 to which a tag conflict avoidance method of the present invention is applied.

The tag 10 includes a storage unit 101, a control unit 102, a code conversion unit 103, and an antenna 104. The storage unit 101 stores a unique identification code of the tag 10, for example, a 64-bit electronic product code. The control unit 102 receives the identification code transmission command from the reader 11 and reads n bits of the identification code stored in the storage unit 101 starting from the MSB (Most Significant Bit). The code conversion unit 103 converts the read n-bit code into a k-bit code including one bit value "1". Here, K is greater than n. The K-bit code is transmitted to the reader 11 through the antenna 104.

The RFID reader 11 includes an antenna 111 and a control unit 112. The control unit 112 transmits the identification code transmission command to the tag 10 through the antenna 111. Also, the control unit 112 identifies the identification code received through the antenna 111.

Figure 2:
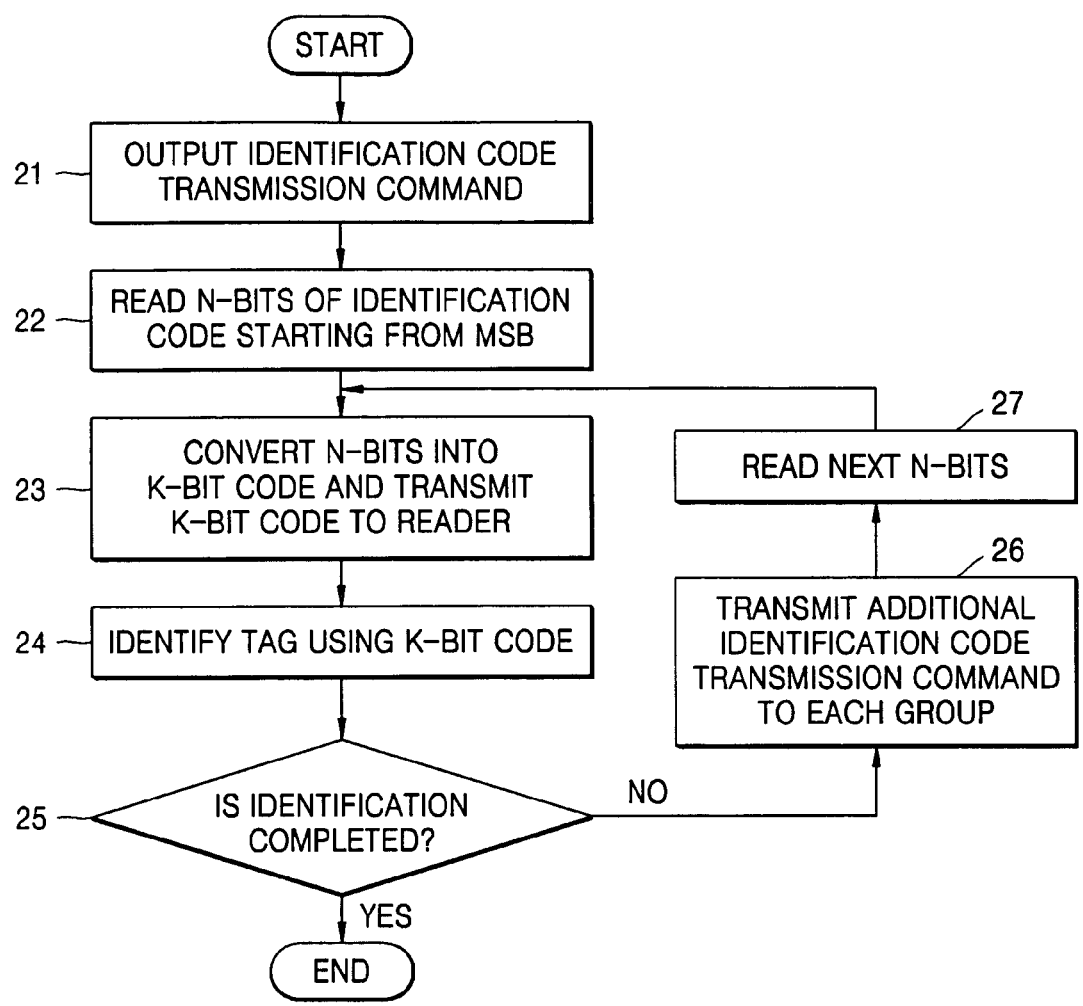
FIG. 2 is a flowchart illustrating the tag conflict avoidance method according to an exemplary embodiment of the present invention.

Operations of the tag 10 and the reader 11 will now be described with reference to FIG. 2 which is a flowchart illustrating the tag conflict avoidance method according to the present invention.

First, the control unit 112 of the reader 11 outputs the identification code transmission command (operation 21). The control unit 102 of the tag 10 reads the n-bit code starting from the MSB of the identification code stored in the storage unit 101 according to the identification code transmission command and outputs it to the code conversion unit 103 (operation 22). The code conversion unit 103 converts the n-bit data into the K-bit code including one bit value "1" and transmits the K-bit code to the reader 11 through the antenna 104 (operation 23). In the code conversion, 3-bit data can be converted into 8-bit data as expressed in Table 1.

TABLE 1

| 3-bit code | Converted code |
| --- | --- |
| 000 | 0000 0001 |
| 001 | 0000 0010 |
| 010 | 0000 0100 |

TABLE 1-continued

| 3-bit code | Converted code |
| --- | --- |
| 011 | 0000 1000 |
| 100 | 0001 0000 |
| 101 | 0010 0000 |
| 110 | 0100 0000 |
| 111 | 1000 0000 |

Figure 3A:
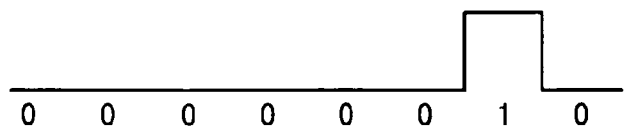
FIGS. 3A, 3B and 3C conceptually illustrate operations of the tag conflict avoidance method according to an exemplary embodiment of the present invention.
Figure 3B:
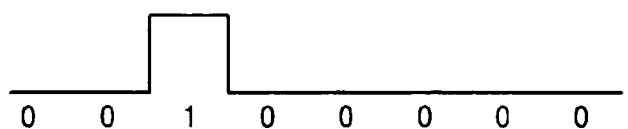
Figure 3C:
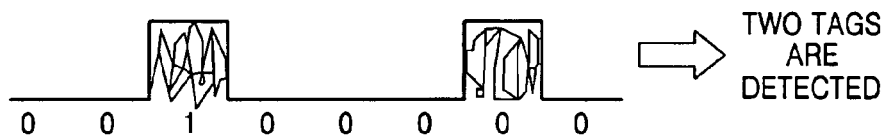

The control unit 112 of the reader 11 judges the location of one bit value "1" in the bit code to identify the tag (operation 24). The tag conflict avoidance method will now be described with reference to FIGS. 3A and 3B which illustrate the identification codes of a first tag and a second tag received by the reader 11, respectively. These identification codes contain one bit value "1" at different locations. FIG. 3C illustrates another example of the identification code received by the reader 11. Referring to FIG. 3C, the reader 11 detects two bit values "1" at the identification locations of the first tag and the second tag, respectively. Thereby, the first and second tags can be identified in the same read field without conflict.

If the identification of every bit of the identification code is completed (operation 25), the process is finished. If the identification is not completed, an additional identification code transmission command for the tags having one value in the code identified in operation 24 is transmitted (operation 26). For example, the tag having the code "0000 0001" is instructed to transmit the next n-bit code. The control unit 102 of the tag which receives the additional identification code transmission command reads the next n-bit code from the identification code (operation 27). The read n-bit data is converted into the code having one bit value "1" by the code conversion unit 103 again and then operations 24 through 27 are repeated.

Figure 4A:
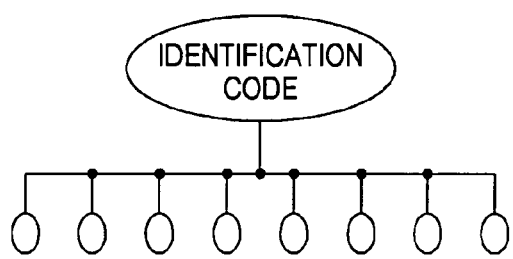
FIG. 4A illustrates a K-nary tree search method of an exemplary embodiment of the present invention.
Figure 4B:
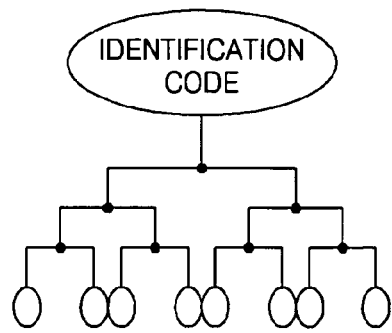
FIG. 4B illustrates a conventional binary tree search method.

FIG. 4A illustrates a K-nary tree search method of the present invention and FIG. 4B illustrates a conventional binary tree search method. Referring to FIGS. 4A and 4B, if a plurality of identification codes are divided into 8 groups, the identification codes can all be classified with just one iteration in the K-nary tree search method of the present invention. However, in the conventional binary tree search method, classification of the identification codes requires seven iterations.

FIG. 5 illustrates a process of identifying a plurality of tags by the conventional binary tree search method when the tags enter into one reader field. In the present embodiment, suppose that the tags are classified into four groups.

Column (a) of FIG. 5(a) illustrates a process by which the reader instructs the tags having identification codes in which 8 bits of the MSB is smaller than 11111111 to transmit their identification codes. Column (b) of FIG. 5 illustrates a process by which the tags transmit their identification codes in response to the transmission command. Here, X marks a bit location where different values in the identification codes of the tags conflict. Referring to column (b) of FIG. 5, the identification codes can be classified into two groups of 101X001X and 111X001X.

Column (c) of FIG. 5 illustrates a process of instructing the tags to transmit identification codes smaller than "10111111" to further classify the group of 101X001X from the read result of column (b) of FIG. 5. Column (d) of FIG. 5 illustrates the process by which tag groups 1 and 2 transmit their identification codes in response to the transmission command of column (c) of FIG. 5 and the read result thereof. Referring to column (d) of FIG. 5, it can be noted that the identification codes are classified into 1010001X, 1011001X, and 111X001X.

Column (e) of FIG. 5 illustrates a process of instructing the tags to transmit identification codes smaller than 11101111 to further classify the group of 111X001X from the read result of column (b) of FIG. 5. Column (f) of FIG. 5 illustrates the process of tag groups 3 and 4 transmitting their identification codes in response to the transmission command of column (e) of FIG. 5 and the read result thereof. Referring to column (f) of FIG. 5, it can be noted that the identification codes are classified into 1110001X and 11110011.

FIG. 6 illustrates a process of identifying a plurality of tags by the K-nary tree search method of the present invention, when the tags enter into a reader field. Column (a) of FIG. 6 illustrates a process by which the reader instructs the tags to transmit their identification codes. Column (b) of FIG. 6 illustrates the result of reading the identification codes transmitted by the tags. Here, X marks the bit location where different values in the identification codes of the tags conflict. Referring to column (b) of FIG. 6, the read result is X0X000XX, and the identification codes are classified into 00000010, 00100000, 00000001, and 10000000.

Comparing the cases shown in FIGS. 5 and 6, it can be noted that the classification is accomplished by one transmission command read operation in the K-nary tree search method, while the full classification requires 7 transmission command read operations in the conventional binary tree search method.

The invention can also be embodied as computer codes stored on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission over the Internet). The computer-readable recording medium can also be distributed over a network of coupled computer systems so that the computer code is stored and executed in a decentralized fashion. Also, functional programs, codes, and code segments for accomplishing the present invention can be easily construed by programmers skilled in the art to which the present invention pertains.

According to the present invention, the identification code can be searched and identified rapidly compared with the conventional binary tree search method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A tag conflict avoidance system, comprising:
a plurality of tags receiving a first signal, converting identification codes of the tags into predetermined codes according to the first signal, and outputting the converted codes as second signals; and
a reader outputting the first signal, receiving the second signals, and identifying the tags using the codes included in the second signals;
wherein the codes are converted by reading n-bits of the identification code and converting the n-bits of the identification code into a K-bit code (K>n) including only one bit value "1".

2. The system according to claim 1, wherein the tag comprises:
- a storage unit storing the identification code;
- a control unit accessing the n-bits of the identification code stored in the storage unit; and
- a code conversion unit converting the read n-bits into the K-bit code.

3. The system according to claim 2, wherein the control unit reads the n bits starting from the most significant bit (MSB) of the identification code when the first signal is repeatedly received, and outputs the n bits to the code conversion unit.

4. The system according to claim 3, wherein the first signal is generated so that the signal which is first transmitted to the tags and the signals which are next transmitted to the tags are distinguished.

5. The system according to claim 1, wherein the reader detects the location of the bit value "1" from the converted code to classify the tags.

6. The system according to claim 2, wherein the code conversion unit transmits the K-bit code to the reader through an antenna.

7. A tag conflict avoidance method, comprising:
- receiving, by a plurality of tags, a first signal;
- accessing and converting, by the plurality of tags, identification codes of the tags into predetermined codes according to the first signal and outputting the converted codes as second signals respectively; and
- receiving the converted codes and classifying the tags;
- wherein the predetermined codes are produced by converting the identification codes into the predetermined codes by:
- accessing n-bits of each identification code starting from the most significant bit (MSB) when the first signal is received; and
- converting the n bits into a K-bit code (K>n) including only one bit value "1".

8. The method according to claim 7, wherein if it is not the first time the first signal is received, reading the identification codes is performed by reading n bits next to a previously read bit of the identification codes.

9. The method according to claim 7, wherein in classifying the tags, the tags are classified according to the location of the bit value "1" in the converted code.

* * * * *